Feb. 20, 1951 R. M. WERNER 2,542,605
VEHICLE DOOR
Filed Sept. 12, 1946 2 Sheets-Sheet 1
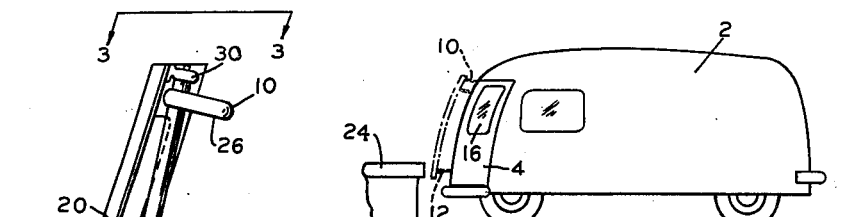
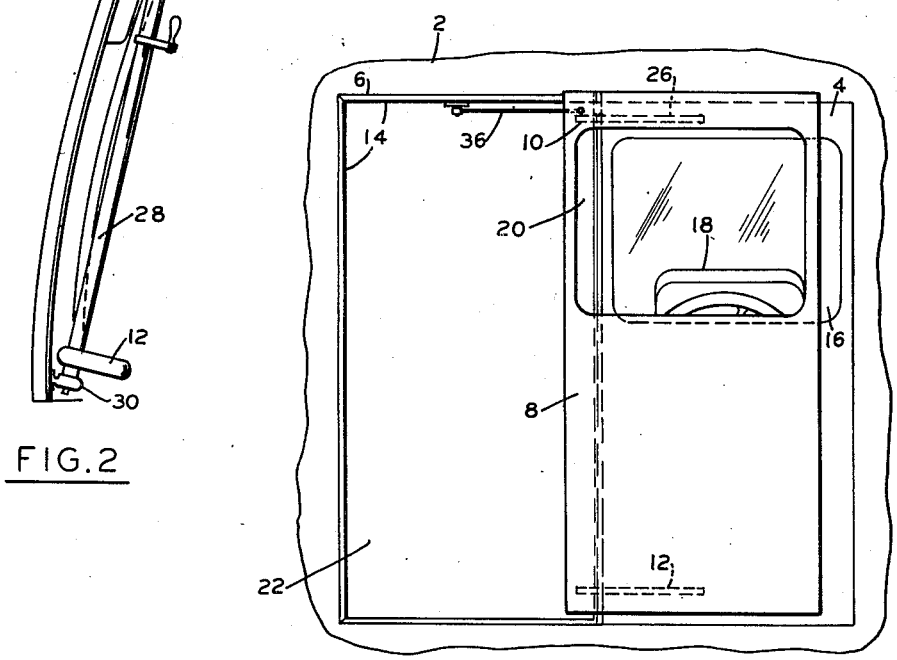
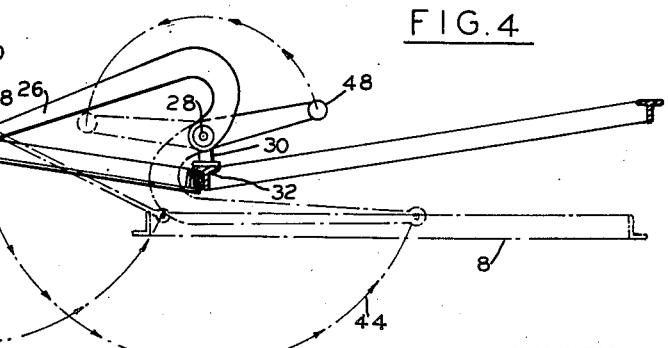
INVENTOR.
RALPH M. WERNER
BY
Albert Sperry
ATTORNEY Feb. 20, 1951    R. M. WERNER    2,542,605
VEHICLE DOOR
Filed Sept. 12, 1946    2 Sheets-Sheet 2
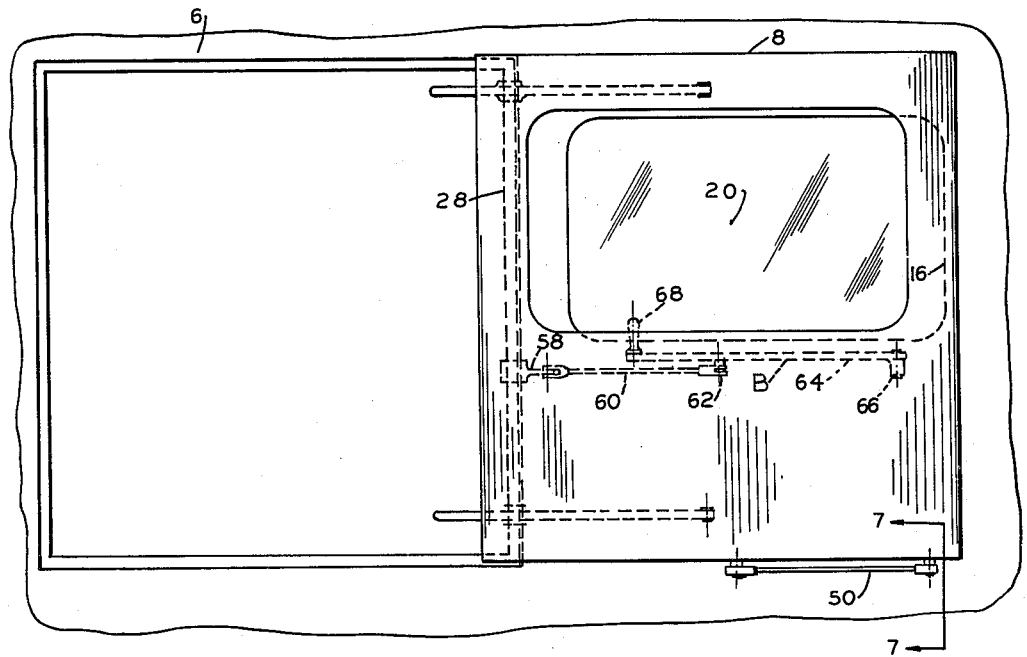
FIG.5
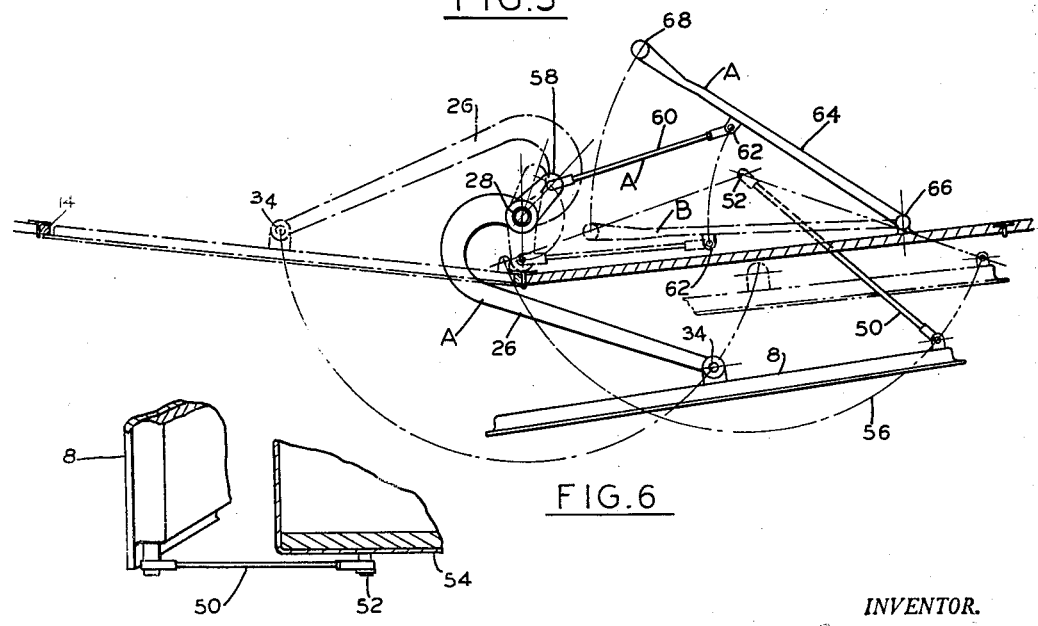
FIG.6
FIG.7
INVENTOR.
RALPH M. WERNER
BY
Albert Sperry
ATTORNEY Patented Feb. 20, 1951

2,542,605

UNITED STATES PATENT OFFICE 2,542,605

VEHICLE DOOR

Ralph M. Werner, Deer Lake, Pa.

Application September 12, 1946, Serial No. 696,471

2 Claims. (Cl. 296—46)

My invention relates to vehicle bodies and particularly to constructions for use on parcel delivery trucks to afford easier access thereto for loading and unloading the parcels to be handled.

Those trucks used in the delivery of parcels or packages by department stores or other delivery services are required to make numerous stops and frequently have to be unloaded in narrow driveways or in other locations where there is only limited space at the side of the truck body. Therefore, the use of doors which swing outwardly at the sides of the body are not satisfactory. Even when sliding doors are provided in the side of the body it is difficult to load long packages such as rugs or linoleum into the truck because they have to be inserted diagonally and then shifted to longitudinal position; and it is often necessary to remove numerous other packages before they can be removed at the place of delivery. Moreover, in loading trucks having doors in the sides of the body the truck has to be parked parallel to a loading platform so that only a limited number of trucks can be loaded at one time.

Trucks having rear doors for loading purposes are capable of being parked at right angles or in inclined positions with respect to a loading platform and can receive long packages more readily. However, in backing a truck up to a loading platform the driver cannot see or judge his position readily and very often backs into the platform and sometimes damages the truck seriously. Furthermore, it is not always possible or economical to provide more than one operator for a parcel delivery truck, and therefore when a single operator uses a truck having doors at the rear of the body he must leave the truck cab and go to the back of the truck in order to open the doors and obtain the articles to be delivered. He must then carry the packages back past the truck to deliver them, and if the space at the side of the truck is limited this is often difficult and it may be necessary to back the truck into place in order to remove the articles from the rear thereof. For these reasons much time is lost in the delivery of parcels with trucks heretofore employed and the cost of delivery is frequently so high as to be uneconomical.

The provision of means for loading and unloading delivery trucks from the front of the truck body will serve to overcome these difficulties and permit speedy delivery of packages and articles including long parcels such as rugs and the like. The driver also may see exactly where he is with respect to a loading platform and thus bring the front end close to the platform without danger of injury to the truck. However, even with such body constructions it is desirable to use special door mounting and moving means to permit opening of the door when the front end of the truck is close to a loading platform and to afford a weather tight construction and one wherein the door will not rattle and may be operated easily.

In accordance with my invention the foregoing disadvantages and limitations of prior delivery truck constructions are overcome and a truck body provided with an access door in the front thereof through which articles may be loaded and unloaded. My invention further embodies novel door mounting and moving means which provide a weather tight assembly permitting easy movement of the door even when the front end of the truck is close to a loading platform or other obstruction.

The principal object of my invention is to reduce the time and cost incurred in the delivery of parcels and packages by truck.

Another object of my invention is to provide a delivery truck with an access door opening toward the front of the truck body.

A further object of my invention is to provide novel door mounting and moving means for doors providing access to the front of truck bodies.

These and other objects and features of my invention will appear from the following description thereof in which reference is made to the figures of the accompanying drawing.

In the drawing:

Fig. 1 is a diagrammatic side elevation of a typical form of delivery truck embodying my invention;

Fig. 2 is a vertical sectional view through the front of the truck illustrated in Fig. 1;

Fig. 3 is a horizontal sectional view taken on the line 3—3 of Fig. 2;

Fig. 4 is a front elevation of a portion of the truck illustrated in Fig. 1;

Fig. 5 is a partial front elevation of the truck embodying an alternative form of my invention;

Fig. 6 is a horizontal sectional view of the front of a truck embodying the alternative construction shown in Fig. 5; and Fig. 7 is a sectional view illustrating a detail of the construction shown in Fig. 5.

In that form of my invention illustrated in Figs. 1 to 4 of the drawing a delivery truck is provided with a body 2 the front of which is formed with a stationary front panel 4 which occupies the left half of the front of the body and a door frame 6 which occupies the right half of the front of the body. The truck body preferably has the main floor thereof substantially level with the axles of the wheels of the truck and therefore the door frame 6 may be approximately the full height of the body. A door 8 is movable into and out of engagement with the door frame 6 and as shown is mounted on the dual hinge members 10 and 12 for moving the door bodily from a closed position in which the door engages sealing means 14 on the frame 6, to an open position in which the door substantially overlies the stationary panel 4 in the front of the truck body.

The stationary panel 4 which is located on the left of the truck body is provided with a window 16 in front of the driver's seat 18, whereas the door 8 which occupies the opposite front half of the vehicle body is provided with a window 20 so that the vision of the driver is not impaired in any way. The door frame 6 and door 8 provide an access opening 22 which is equal to substantially half the width of the truck body so that rugs or long packages may be loaded directly and easily into the body and may be removed from the front of the body for delivery. Moreover, a single operator may serve as driver and as he opens the door 8 to leave the driver's seat he has immediate access to the body for removal of packages and parcels therefrom without going to the rear of the truck or opening any other doors.

The door 8, as shown in Fig. 3, is mounted for movement bodily from the fully closed position shown in full lines to the fully opened position shown in dotted lines. During such movement the door is maintained in a position substantially parallel with the stationary panel 4 but travels laterally in a relatively flat arc so that it does not swing outward away from the vehicle far enough to prevent the vehicle from being parked close to a loading platform such as that indicated at 24 in Fig. 1.

In the construction illustrated the dual hinge members 10 are located adjacent the upper horizontal edge of the door 8 while the dual hinge members 12 are located adjacent the lower edge of the door. Each of these dual hinges includes a J-shaped arm 26 fixedly secured to a shaft 28 mounted for rotation in bearing brackets 30 on the column 32 adjacent the center of the front of the truck body. The outer end of the arm 26 is pivotally connected at 34 to the door 8 at a point approximately midway between the vertical edges of the door. The dual hinge members each further include a rod 36 pivotally mounted at 38 on a support 40 secured to the door frame 6 or adjacent thereto at a point approximately midway between the vertical edges of the door frame. The opposite end of the rod 36 is pivotally connected at 42 to the door 8 adjacent the outer vertical edge thereof. The dual hinge members thus provided serve to cause the door 8 to move bodily and in a lateral direction into and out of engagement with the sealing means 14 carried by the door frame 6. During this movement the free ends of the arm 26 and the rod 36 travel through the arcs indicated in dotted lines at 44 and 46 respectively in Fig. 3. No portion of the door 8, when thus supported and moved, will ever extend forward from the door frame 6 a distance greater than about one-half the width of the door so that the front of the vehicle can be brought close to the loading platform even before the door is opened if desired. Moreover, when door 8 is in its fully opened position wherein it overlies the stationary front panel 4, the window 20 in the door registers approximately with the window 16 in panel 4 so that the operator can see through the window as well as the door, and can bring the front of the vehicle up almost into direct contact with the loading platform without danger of injury to the truck.

With this construction the door 8 is movable into sealing relation with the sealing means 14 extending about the edges of the door frame and as the final closing movement of the door takes place it travels in a direction substantially normal to the frame so as to reduce relative lateral movement of the door and sealing means to a negligible amount, thereby insuring a weather tight seal about the door opening.

Movement of the door to or from its closed and sealing position can be effected very easily by means of an operating handle 48 carried by the shaft 28. The operating handle is located in a convenient position to be grasped by the operator when seated in the driver's seat on the left hand side of the truck adjacent the front panel 4, and movement of this handle to rotate shaft 28 and hinge arms 26 permits ready movement of the door to and from its opened position.

An alternative construction for the dual hinge means and operating mechanism is illustrated in Figs. 5 and 6. In this form of my invention the J-shaped arm 26 and shaft 28 are similar in construction and location to the corresponding elements of Figs. 1 to 4. However, the rod 36 is replaced by a rod 50 pivotally connected at 52 to an element secured to the bottom of the floor 54 of the truck body. The opposite end of the rod 50 is connected to the door 8 at the bottom thereof adjacent the central vertical edge of the door so as to move through an arc 56 during movement of the door into and out of a closed position. The door is thus caused to move bodily and in a lateral direction as in that form of my invention previously described. The operating means for the door shown in Fig. 5 includes the arm 58 secured to shaft 28 and having a link 60 connected thereto. The opposite end of the link 60 is pivotally connected at 62 to an operating arm 64 pivotally mounted at 66 on the body and having a handle 68 connected to the free end thereof.

With this construction, and when the door is in the closed position shown in dot and dash lines in Fig. 6 the arm 58 extends forward and the handle 68 and operating arm 64 are pushed forward so that they will not interfere with the operation of the truck. The elements then cannot be moved further forward so that the door is in effect locked in its closed position. When opening the door the operator first pulls handle 68 inward, that is, away from the front panel 4, until the elements assume the positions shown at A in full lines in Fig. 6 wherein the arm 58 is rotated through an arc greater than 90° from the closed position, and the door 8 is opened, but is not yet in a fully overlapped position with respect to the front panel 4. Thereafter the operator pushes the handle 68 forward to the position shown at B in dotted lines in Fig. 6, whereupon the arm 58 is rotated further so that it extends rearwardly from the shaft 28 and the door 8 is moved to its fully overlapping position with respect to panel 4. The handle then can be moved no further forward and thus in effect serves to lock or hold the door in its fully opened position. The operating mechanism thus is constructed and arranged to operate as a toggle, which moves the arm 58 through an arc of about 180° and has limited holding positions wherein it serves to retain the door in either a fully opened or a fully closed position.

In each of the forms of my invention herein shown and described the construction permits the truck to be driven forwardly into position with its front end close to the loading platform 24 after which the operator may open the door by grasping and moving the handle 48 or 68. The door is thus moved outward away from the sealing means on the door frame 6 but its outer edge is guided by the rod 36 or 50 of the dual hinge members so that the door is caused to move bodily and in a lateral direction into overlapping relation with respect to the stationary front panel 4 of the truck body. The door opening on the right hand side of the truck body is then unobstructed and articles may be loaded directly from the loading platform into the front of the truck.

Thereafter in delivering parcels or packages the operator can drive directly into a narrow driveway or alley and close to a loading platform or other location to which the parcels are to be delivered. He can then open the front door 8 and remove parcels through the front door without passing to the rear of the truck. Furthermore, it is not necessary to back the truck into place or to carry parcels past the truck in order to make a delivery. The operator may return directly to the driver's seat through the front door in the truck body and may close the door without moving from his seat. He is then ready to move on to make a further delivery. In this way up to ten percent of the time of the operator may be saved so that many more deliveries may be made whereas only one operator is necessary for each truck and he will only have to travel approximately half as far in making each delivery.

While I have illustrated and described a particular and preferred form of door mounting and moving means which has proved to be most successful in actual operation, it will be apparent that numerous changes and modifications may be made in the form, construction and arrangement of the elements employed without departing from the spirit and scope of my invention. In view thereof it should be understood that the form of my invention shown in the drawings and described above is intended to be illustrative only and is not intended to limit the scope of my invention.

I claim:

1. A truck body having a stationary front panel occupying substantially the entire left hand half of the front of the body and formed with a window therein, a door opening in the front occupying substantially the entire right hand half of the front of the body, a door for said opening having a window therein, said door and front panel cooperating to present a substantially continuous unbroken surface at the front of said body, a shaft positioned substantially vertically and rotatably mounted on the front of said body near the center thereof, a J-shaped hinge member having the end of its shorter arm fixedly connected to said shaft and having the end of its longer arm pivotally connected to said door at a fixed point adjacent the vertical center line of the door, supplemental hinge means pivotally connected at one end to a fixed point on said body and having its opposite end pivotally connected to said door at a fixed point adjacent one vertical edge thereof to guide said edge on bodily movement of the door, an arm connected to said shaft, and rotatable therewith through an arc of approximately 180° to move said door bodily and in a lateral direction from a fully closed position to a fully opened position in which the door overlies said front panel of the body and said windows are in approximate registration, and toggle means connected to said arm and movable to alternative limiting positions to move said door to and to retain said door in said fully closed and fully opened position.

2. A truck body having a stationary front panel occupying substantially the entire left hand half of the front of the body and formed with a window therein, a door opening in the front occupying substantially the entire right hand half of the front of the body, a door for said opening having a window therein, said door and front panel cooperating to present a substantially continuous unbroken surface at the front of said body, a shaft positioned substantially vertically and rotatably mounted on the front of said body near the center thereof, a J-shaped hinge member having the end of its shorter arm fixedly connected to said shaft and having the end of its longer arm pivotally connected to said door at a fixed point adjacent the vertical center line of the door, supplemental hinge means pivotally connected at one end to a fixed point on said body and having its opposite end pivotally connected to said door at a fixed point adjacent one vertical edge thereof to guide said edge on bodily movement of the door, an arm connected to said shaft, and rotatable therewith through an arc of approximately 180° to move said door bodily and in a lateral direction from a fully closed position to a fully opened position in which the door overlies said front panel of the body and said windows are in approximate registration.

RALPH M. WERNER.

REFERENCES CITED

The following references are of record in the file of this patent:

UNITED STATES PATENTS

| Number | Name | Date |
| --- | --- | --- |
| 401,758 | Reade | Apr. 23, 1889 |
| 546,116 | Hield | Sept. 10, 1895 |
| 859,344 | Silver | July 9, 1907 |
| 963,854 | Bieber | July 12, 1910 |
| 965,770 | Voigt | July 26, 1910 |
| 1,434,705 | Jeanes | Nov. 7, 1922 |
| 1,829,597 | Ledwinka | Oct. 27, 1931 |
| 2,267,509 | Strong | Dec. 23, 1941 |

FOREIGN PATENTS

| Number | Country | Date |
| --- | --- | --- |
| 440,647 | France | May 8, 1912 |
| 294,017 | Great Britain | July 19, 1928 |
| 394,318 | Great Britain | June 9, 1933 |

OTHER REFERENCES

Article, "The Body of the Month," March 1941 issue of Commercial Car Journal, pages 32, 33.